United States Patent
Chen (10) Patent No.: US 7,502,412 B2
(45) Date of Patent: Mar. 10, 2009

(54) ADAPTIVE CHANNEL ESTIMATION USING DECISION FEEDBACK

(75) Inventor: Sheng-Jie Chen, Longtan Shiang (TW)

(73) Assignee: Qisda Corporation, Taoyuan County (TW)

( * ) Notice: Subject to any disclaimer, the term of this patent is extended or adjusted under 35 U.S.C. 154(b) by 722 days.

(21) Appl. No.: 10/850,275

(22) Filed: May 20, 2004

(65) Prior Publication Data

US 2005/0259770 A1 Nov. 24, 2005

(51) Int. Cl.
*H03H 7/30* (2006.01)
*H03H 7/40* (2006.01)

(52) U.S. Cl. .............. 375/229; 375/230; 375/233; 375/346; 375/348

(58) Field of Classification Search .......... 375/130, 375/139, 142, 144, 150, 229–236, 316, 322, 375/324, 326, 340, 341, 343, 344, 346, 348, 375/350, 259, 260, 261, 262

See application file for complete search history.

(56) References Cited

U.S. PATENT DOCUMENTS

| | | | | |
|---|---|---|---|---|
| 5,063,573 A * | 11/1991 | Langewellpott | .............. | 375/232 |
| 5,325,397 A * | 6/1994 | Scholz et al. | ................ | 375/224 |
| 5,513,215 A * | 4/1996 | Marchetto et al. | ........... | 375/233 |
| 5,920,599 A * | 7/1999 | Igarashi | ....................... | 375/341 |
| 6,269,116 B1 * | 7/2001 | Javerbring et al. | ........... | 375/229 |
| 6,269,124 B1 * | 7/2001 | Nagayasu et al. | ............ | 375/262 |
| 6,304,599 B1 * | 10/2001 | Igarashi | ....................... | 375/232 |
| 6,343,210 B1 * | 1/2002 | Emmons et al. | ........... | 455/226.3 |
| 6,347,126 B1 * | 2/2002 | Nagayasu et al. | ............ | 375/344 |
| 6,389,574 B1 * | 5/2002 | Belveze et al. | .............. | 714/795 |
| 6,400,928 B1 * | 6/2002 | Khullar et al. | ............ | 455/67.11 |
| 6,782,060 B2 * | 8/2004 | Hartmann et al. | ........... | 375/341 |
| 6,819,630 B1 * | 11/2004 | Blackmon et al. | ........... | 367/134 |
| 6,937,648 B2 * | 8/2005 | Raphaeli | ...................... | 375/229 |
| 7,203,461 B2 * | 4/2007 | Chang et al. | ............. | 455/67.13 |
| 2001/0004390 A1 * | 6/2001 | Pukkila et al. | .............. | 375/340 |
| 2001/0043650 A1 * | 11/2001 | Sommer et al. | ............. | 375/232 |
| 2004/0199858 A1 * | 10/2004 | Becker et al. | ................ | 714/795 |
| 2004/0240595 A1 * | 12/2004 | Raphaeli | ...................... | 375/350 |
| 2005/0259770 A1 * | 11/2005 | Chen | .......................... | 375/346 |

* cited by examiner

*Primary Examiner*—Chieh M Fan
*Assistant Examiner*—Jason M. Perilla (57) ABSTRACT

A method and system thereof for determining feedback for iterative channel estimation based on the summation of soft output decisions or Bit Error Rate (BER) derived from the output of an equalizer. The channel impulse response initially obtained according to a training sequence is used to estimate the received signal, and output hard values. The BER of the training sequence is calculated and judged, and if the BER is too high, the channel is estimated again according to the feedback until the BER satisfies a predetermined value. If the BER is still unsatisfactory after a predetermined number of trials, the channel is assumed to be an authentic bad channel, thus terminating the feedback procedure. If the equalizer is capable of outputting soft output decision, the summation of soft outputs is used instead of BER to determine whether feedback is appropriate.

10 Claims, 9 Drawing Sheets

ADAPTIVE CHANNEL ESTIMATION USING DECISION FEEDBACK

BACKGROUND OF THE INVENTION

1. Field of the Invention

The present invention relates to channel estimation and equalization in a wireless communication system, and more specifically, to channel estimation using decision feedback.

2. Description of the Related Art

The modulation algorithm employed in both Global System for Mobile (GSM) and General Packet Radio System (GPRS) communication networks is Gaussian Minimum Shift Keying (GMSK), which induces inter-symbol interference (ISI) in the received signal sampled. ISI is the residual effect of other neighboring symbols when decoding a certain symbol, and this residual effect is due to the occurrence of pulses before and after the sampling instant. The unavoidable presence of ISI in the system, however, introduces errors in the decision device at the receiver output. Therefore, in the filter design of the GSM/GPRS receiver and transmitter, the objective is to diminish the effects of ISI and thereby deliver the digital data to the destination with the smallest error rate possible. An equalizer is a widely used approach for compensating or reducing the ISI effect.

Figure 1:
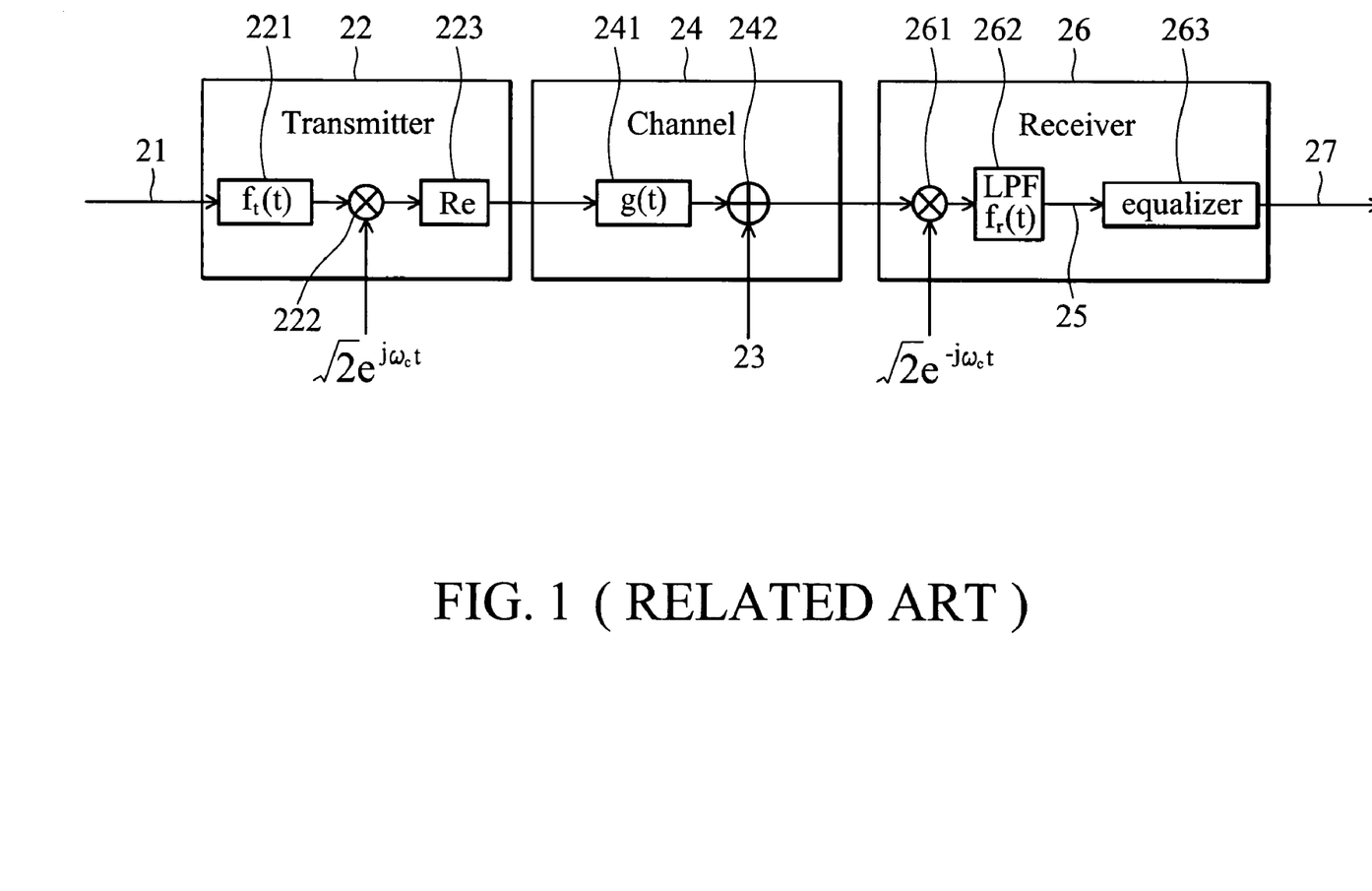
FIG. 1 is a block diagram illustrating the transmission model for a wireless communication system.

An exemplary transmission model of a wireless communication system is shown in FIG. 1. A signal 21 from the transmitter 22 is first filtered by a Low Pass (LP) filter 221, converted to radio frequency (RF) by multiplying a carrier in a multiplier 222, and finally passed to a processing unit 223 before transmission to the channel 24. The processing unit 223 extracts the real part of the signal. The characteristic of the channel 24 is modeled by a channel response block 241 with channel noise 23. The channel noise 23 is generally assumed as Additive White Gaussian Noise (AWGN). The multiplier 261 in the receiver 26 converts back the frequency of the signal received by the receiver by multiplying the same frequency as the carrier frequency. The LP filter 262 receives the down converted signal, and outputs a received signal 25. The equalizer 263 compensates the ISI of the received signal 25, and outputs an estimated signal 27. The received signal r(t) 25 is expressed by Equation [1]. Channel response g(t), filter response $f_t(t)$ of the transmitter 22, and filter response $f_r(t)$ of the receiver 26 can be combined as a channel impulse response h(t) which models the response of the transmission channel including the transmitting and receiving ends. The channel impulse response h(t) is the convolution of $f_t(t)$, g(t), and $f_r(t)$.

$$r(t) = \sum_n a_n h(t - nT) + n(t) \quad \text{Equation [1]}$$

The channel noise n(t) 23 herein is assumed to be stationary Gaussian noise with zero mean and variance $N_o$. Let $\{\alpha_n\}$ (which is also the signal 21 in FIG. 1) be a hypothetical sequence of pulse amplitudes transmitted during a time period I. The equalizer 263 is assumed to be a Maximum Likelihood (ML) equalizer, which determines the best estimation of $\{\alpha_n\}$ as the estimated sequence $\{\hat{a}_n\}$ (signal 27 of FIG. 1). The estimated sequence $\{\alpha_n\}=\{\hat{a}_n\}$ is derived by maximizing the likelihood function as shown in Equation [2].

$$p[r(t), t \in I | \{\alpha_n\}] \quad \text{Equation [2]}$$

The probability of 0s and 1s in the transmitted sequences are assumed to be equal, therefore, Equation [2] can be rewritten as:

$$p[\{\alpha_n\} | r(t)] = \frac{p(r(t) | \{\alpha_n\}) p(\{\alpha_n\})}{p(r(t))} \quad \text{Equation [3]}$$

$p[\{\alpha_n\}|r(t)]$ is also called the posteriori probability. The probability of the estimated sequence $p[\{\alpha_n\}]$ and the received signal r(t) are both assumed to be constant. Since the objective of the ML equalizer is to maximize the likelihood function shown in Equation [2], the posteriori probability must also be maximized. If the sequence $\{\alpha_n\}$ was the actual sequence of the pulse amplitude transmitted during time period I, the power density function of the noise signal n(t) can be expressed as shown in Equation [4].

$$n(t | \{\alpha_n\}) = r(t) - \sum_{nT \in I} \alpha_n h(t - nT), \, t \in I \quad \text{Equation [4]}$$

The ML function of Equation [2] thus becomes:

$$p(r(t) | \{\alpha_n\}) = $$

$$p[n(t) | \{\alpha_n\}] = \left(\frac{1}{2\pi N_o}\right)^N \exp\left(-\frac{1}{2N_o} \sum_{k=1}^{N} \left| r_k - \sum_n \alpha_n h_{kn} \right|^2\right) \quad \text{Equation [5]}$$

The probability of the ML function $p[r(t)|\{\alpha_n\}]$ is proportional to the logarithm of $p[r(t)|\{\alpha_n\}]$:

$$-\int_{-\infty}^{\infty} \left| r(t) - \sum_n \alpha_n h(t - nT) \right|^2 dt = \quad \text{Equation [6]}$$

$$-\int_{-\infty}^{\infty} |r(t)|^2 dt + 2Re \sum_n \left[ \alpha_n^* \int_{-\infty}^{\infty} r(t) h^*(t - nT) dt \right] -$$

$$\sum_n \sum_m \alpha_n^* \alpha_m \int_{-\infty}^{\infty} h^*(t - nT) h(t - mT) dt$$

The first term of Equation [6] is a constant, thus it can be discarded when calculating the metric. A correlation metrics (MC) can be derived from the previous steps as shown in Equation [7].

$$CM(\{\alpha_1\}) = 2Re \sum_{nT \in I} (\alpha_n^* Z_n) - \sum_{iT \in I} \sum_{kT \in I} \alpha_n^* \alpha_k s_{i-k} \quad \text{Equation [7]}$$

where
$$z_n = g_{MF}(t) * r(t)|_{t=nT} = \sum_l a_{n-l} s_l + w_n$$
$$s_l = g_{MF}(t) * h(t)|_{t=lT} = s_{-l}^* \text{ and}$$
$$g_{MF}(t) = h^*(-t)$$

$s_l$ herein is the channel response autocorrelation.

Maximum Likelihood Sequence Estimation (MLSE) determines the most likely sequence originally transmitted by the sequence $\{\alpha_n\}$ by maximizing the likelihood function shown in Equation [5], or equivalently, maximizing the metric shown in Equation [8].

$$J_n(\{\alpha_l\}) = 2Re \sum_{nT \in I} (\alpha_n^* Z_n) - \sum_{iT \in I} \sum_{kT \in I} \alpha_i^* s_{i-k} \alpha_k \qquad \text{Equation [8]}$$

The MLSE algorithm obtained represents a modified version of the well-known Viterbi algorithm. The Viterbi algorithm is obtained by computing the recursive relation iteratively.

$$J_n(\ldots, \alpha_{n-1}, \alpha_n) = \qquad \text{Equation[9]}$$
$$J_{n-1}(\ldots, \alpha_{n-1}) + Re\left[\alpha_n^*\left(2Z_n - s_0\alpha_n - 2\sum_{k \leq n-1} s_{n-k}\alpha_k\right)\right]$$

Figure 2:
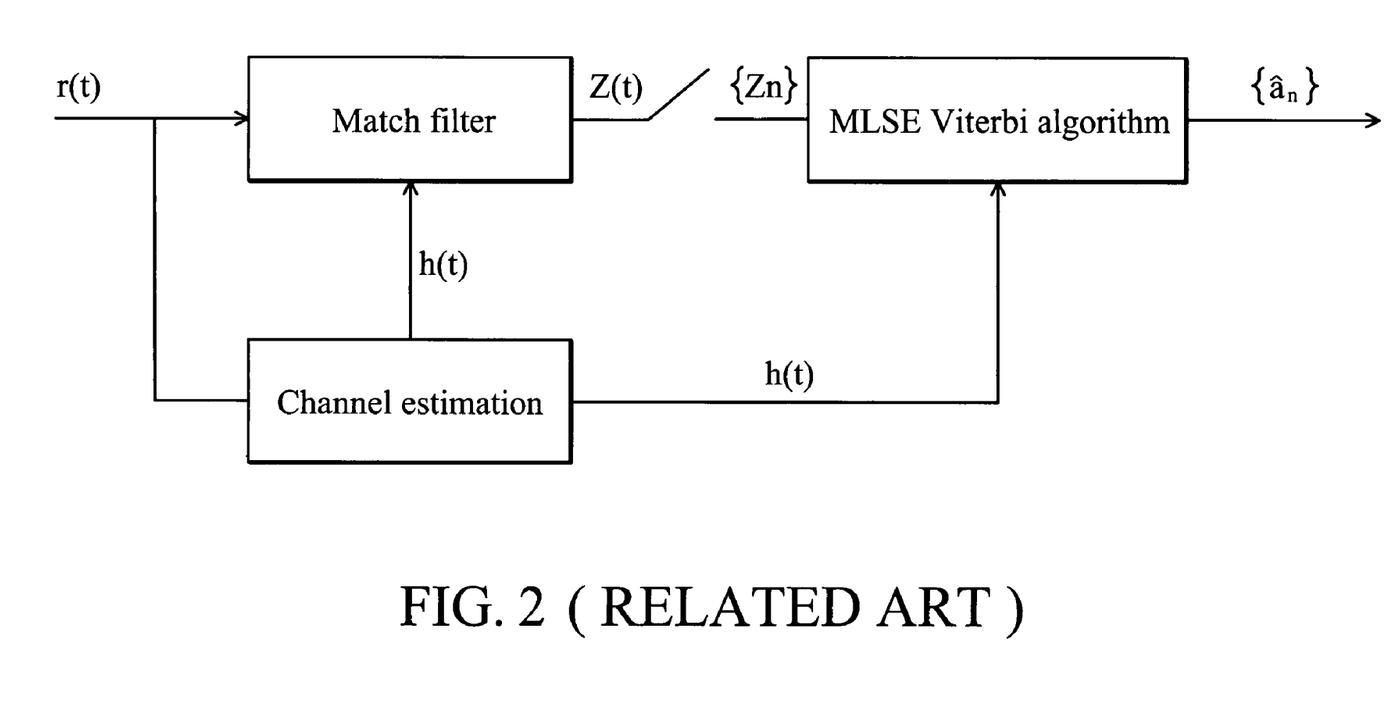
FIG. 2 is a block diagram illustrating the architecture of a Viterbi equalizer.

FIG. 2 shows the architecture of the Viterbi Equalizer, wherein the received signal r(t) is estimated according to Equation [1].

Figure 3:
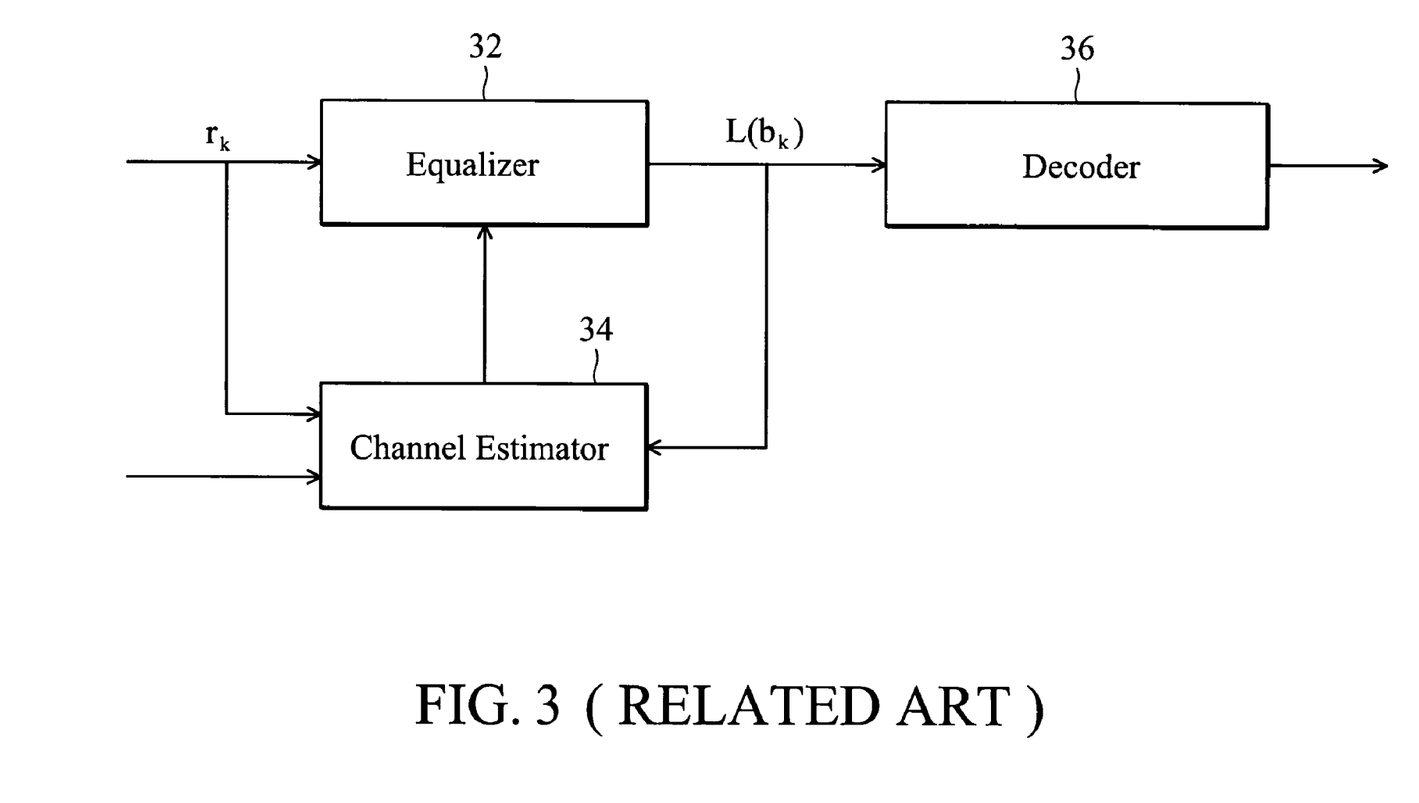
FIG. 3 is a block diagram of iterative channel estimation and equalization.

FIG. 3 is a block diagram showing iterative channel estimation and equalization. The channel impulse response estimated by the channel estimator 34 must be updated frequently to maintain the accuracy of the estimation. There are several well known techniques such as Least Square (LS) and Minimum Mean Square Estimation (MMSE) using decision feedback circuit to achieve better estimation of channel impulse response. As shown in FIG. 3, the initial channel estimation is obtained by passing a training sequence to the channel estimator 34. After a block of data is equalized in the equalizer 32, the output is fed back to the adaptive channel estimator 34 to generate a better estimation for the equalizer 32. Such channel estimation and equalization procedures are performed iteratively to adapt variable transmission channel conditions. The equalizer 32 outputs either hard value decisions according to Hard Output Viterbi Algorithm (HOVA) or soft value decisions according to Soft Output Viterbi Algorithm (SOVA) to the channel estimator 34 and decoder 36.

It is assumed that the number of channel taps is L and the received signal r consists of N samples. The received signal can be expressed as:

$$r = Bh + n \qquad \text{Equation [10]}$$

where B is the matrix with the transmitted bits, h is the channel, and n is the channel noise. The matrix product Bh corresponds to the convolution between $b_k$ and $h_k$. From the LS algorithm, the channel can be estimated as:

$$\hat{h}^{LS} = (B^H B)^{-1} B^H r \qquad \text{Equation [11]}$$

where $O^H$ denotes Hermitian transpose.

For HOVA, the channel is estimated as:

$$\hat{h}_m^{HO\_LS} = (B^H B)^{-1} \sum_{k=L-1}^{N-1} r_k b_{k-m}, b_k = \pm 1 \qquad \text{Equation [12]}$$

For SOVA, the channel is estimated as:

$$\hat{h}_m^{SO\_LS} = (B^H B)^{-1} \sum_{k=L-1}^{N-1} r_k b_{k-m} \qquad \text{Equation [13]}$$

where $$b_k = E\{b_k \mid r\} = 2P\{b_k = +1 \mid r\} - 1 = \tanh\left(\frac{L(b_k \mid r)}{2}\right)$$
$$L(b_k \mid r) = \log\frac{Pr(b_k = +1 \mid r)}{Pr(b_k = -1 \mid r)}$$
$$Pr(b_k = +1 \mid r) = \frac{e^{L(b_k \mid r)}}{1 + e^{L(b_k \mid r)}}$$

Various techniques in the art focus on the method of achieving better channel impulse estimation using decision feedback. The Least Square (LS) technique is used here as an example to illustrate the channel estimation operation, while other techniques omitted herein as the method provided in the present invention does not teach a way of estimating channel impulse response. The present invention focuses on determining whether decision feedback is required for the channel estimator to achieve a better channel estimation for the equalizer.

SUMMARY OF THE INVENTION

Accordingly, the object of the present invention is to determine whether decision feedback is required to achieve a better channel impulse response, thus improving system performance.

The present invention provides a method and system thereof for determining when to provide feedback to the channel estimator. The proposed method determines the feedback decision based on the summation of soft output decisions or Bit Error Rate (BER) derived from the output of the equalizer. The architecture of the equalizer can be either Soft Output Viterbi Algorithm (SOVA) or Hard Output Viterbi Algorithm (HOVA). The SOVA equalizer outputs hard values with the corresponding reliability called soft values, whereas the HOVA equalizer outputs only hard values.

In the SOVA architecture, the channel impulse response is initially obtained by correlating the received signal with a known training sequence. The channel impulse response is used to estimate the received signal to generate hard values and corresponding soft values. A soft summation is the sum of the soft values, and is compared to a first threshold. If the soft summation exceeds the first threshold, the hard values are passed for de-interleaving and decoding. Otherwise the channel impulse response is updated according to the soft values in order to improve the accuracy of the channel impulse response. A counter is set to count the number of times the soft summation falls below the first threshold, and once the counter exceeds a second threshold, the channel is assumed to be too noisy and cannot be improved with further iterative channel estimation.

In the HOVA architecture, the operations are similar to the operations in the SOVA architecture except that only hard values are generated, and the Bit Error Rate (BER) of the training sequence is calculated as an indication of the accuracy of the channel estimation. The lower the BER value, the better the channel estimation. If the number of times the calculated BER falls below a third threshold is within a fourth threshold, the channel impulse response is updated by feeding the hard values back to achieve a better channel estimation. The BER is calculated by comparing the known training sequence with the computed hard values.

The system proposed in the present invention comprises a channel estimator, an equalizer, a feedback decision-maker, a de-interleaver, and a decoder. The channel estimator computes a channel impulse response for the received signal, and passes it to the equalizer. The equalizer uses Maximum Likelihood Sequence Estimation Viterbi Algorithm to estimate the received signal, which produces hard values and corresponding soft values if implementing SOVA, or produces hard values only if implementing HOVA. The feedback decision-maker coupled to the SOVA equalizer accumulates the soft value to get a soft summation, and determines if providing feedback to the channel estimator is appropriate according to the soft summation. In the NOVA architecture, the feedback decision-maker coupled to the NOVA equalizer calculates the BER of the training sequence for determining whether feedback is required according to the calculated BER. The feedback decision-maker calculates the BER by comparing the known training sequence with the hard values computed by the equalizer. The de-interleaver performs de-interleaving on the hard values, and the decoder decodes the de-interleaved hard values.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION OF THE INVENTION

The performance of the Maximum Likelihood Sequence Estimation (MLSE) equalizer used in the wireless communication system depends on the accuracy of the estimated channel impulse response. Iterative channel estimation using decision feedback is a common method employed to achieve more accurate channel estimation. The present invention provides a method and system for determining whether decision feedback is appropriate to compromise between computation complexity and performance.

Figure 4:
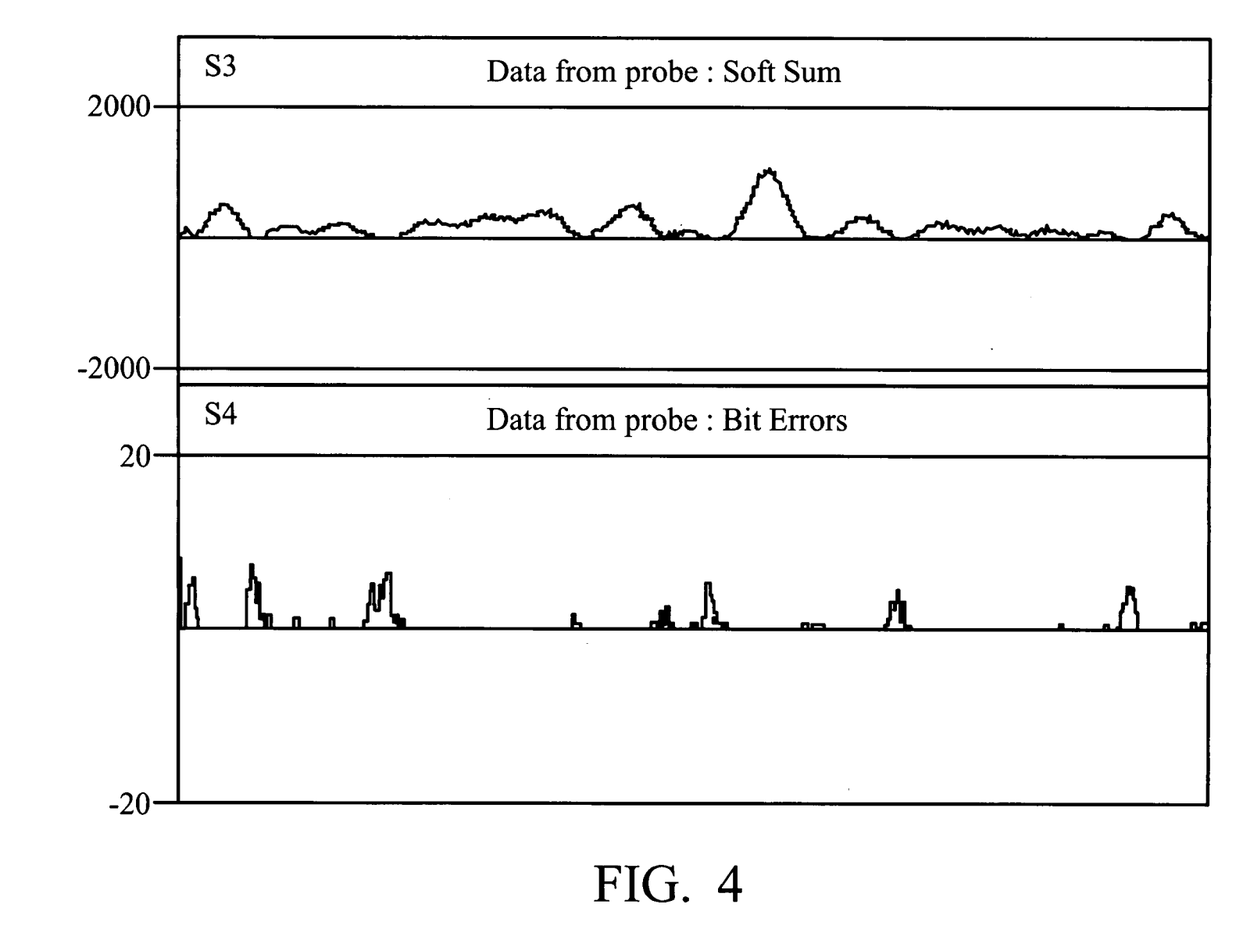
FIG. 4 is a simulation graph showing the relationship between the soft summation and the Bit Error Rate (BER).

In the SOVA architecture, by observing the simulation result, the summation of the soft values is proportional to the power of the estimated channel impulse response. The summation of the soft values is comparatively small and the BER is high when the channel is fading. FIG. 4 shows the relationship between the soft summation and the BER. It is desirable to increase the soft summation value or reduce the BER in order to improve the system performance, which is achieved by applying more accurate channel impulse response to the MLSE equalizer. In the SOVA system, the soft summation 'SoftSum' is an indicator for determining whether feedback of the soft values to the channel estimator is appropriate. Conversely, in the HOVA system, BER of the training sequence is an indicator for determining whether feedback of the hard values to the channel estimator is appropriate.

Figure 5:
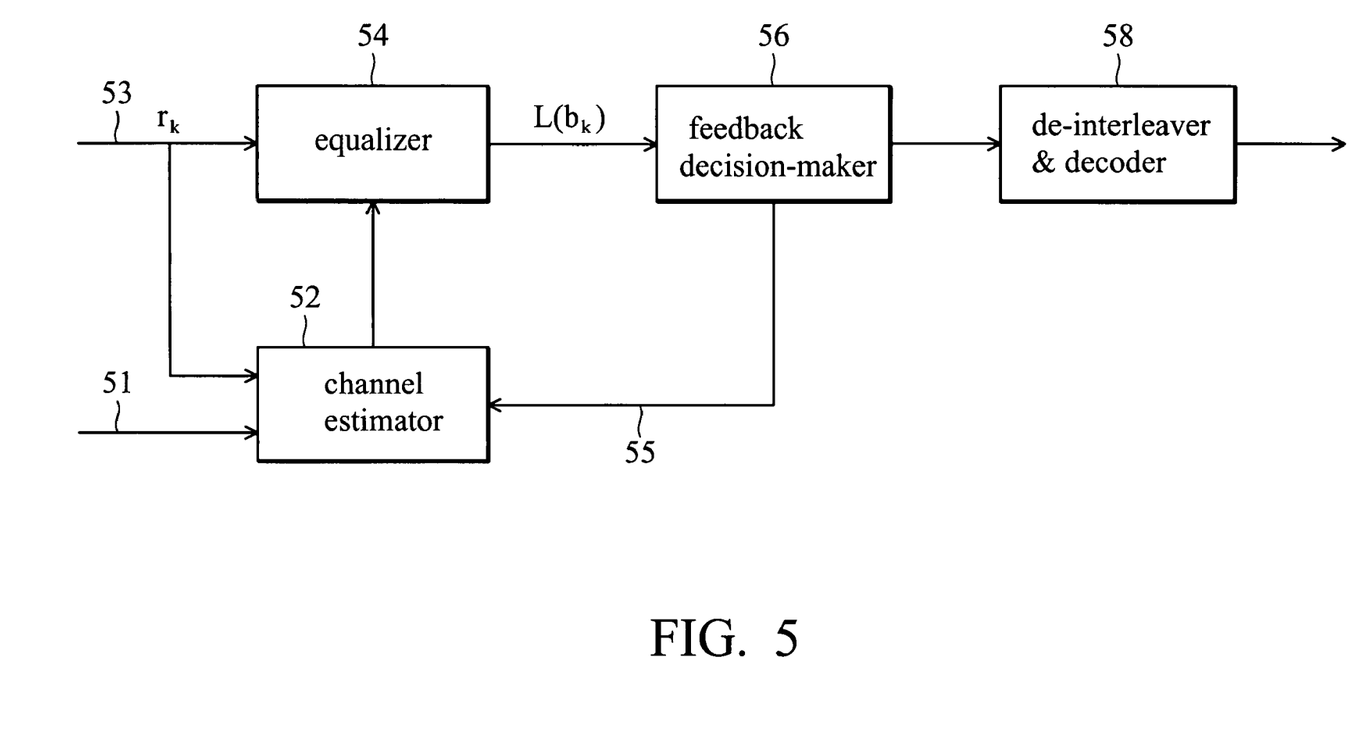
FIG. 5 is a block diagram of the system according to the embodiment of the present invention.

FIG. 5 shows the system proposed in the present invention to determine the feedback decision for the equalizer 54. The channel estimator 52 estimates an initial channel impulse response by correlating the received signal 53 with a known training sequence 51. The estimated channel impulse response is then passed to the equalizer 54. The equalizer 54 estimates the received signal 53 using MLSE Viterbi Algorithm, and outputs estimated hard values. If a SOVA equalizer is used, it also outputs corresponding reliability data called soft values with the hard values. The feedback decision-maker 56 determines whether feedback 55 is appropriate according to either the summation of the soft values or the BER depending on whether equalizer 54 employs SOVA or HOVA. If the channel impulse response estimated by the channel estimator 52 is adequate, the feedback decision-maker 56 passes the hard values to the de-interleaver and decoder 58 to recover the received signal.

A detailed description of the adaptive channel estimation method according to the present invention is described in the following. The complete flowchart for SOVA and HOVA systems are shown in FIGS. 6A-6B and 7A-7B, respectively.

Figure 6A:
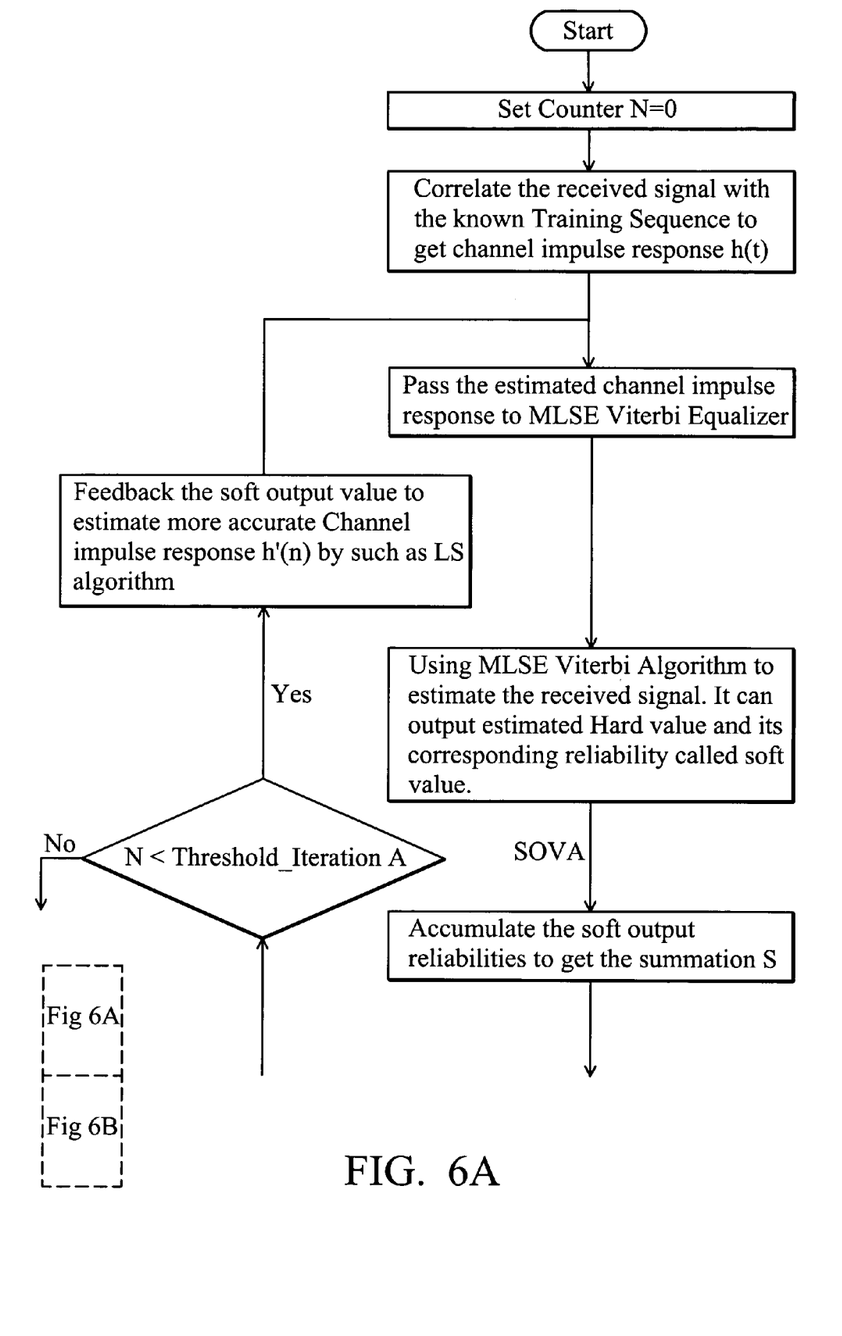
FIGS. 6A and 6B are flowcharts of iterative channel estimation using decision feedback for a SOVA system according to the present invention.
Figure 6B:
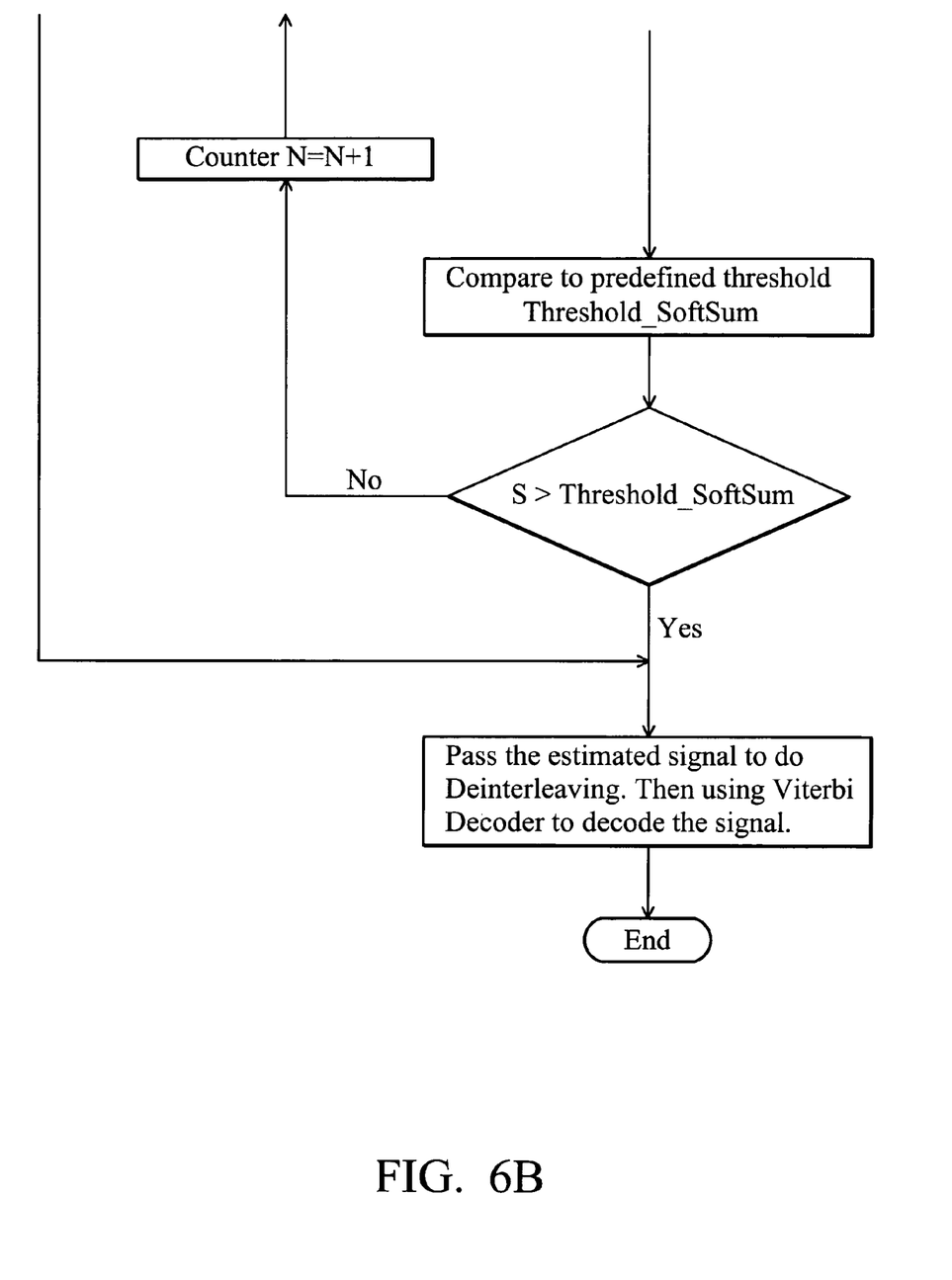

A SOVA system initializes the counter N=0, then correlates the received signal with a known training sequence to get an initial channel impulse response h(t). The estimated channel impulse response is passed to the equalizer. The received signal is estimated using MLSE Viterbi Algorithm, and the estimated hard values and the corresponding reliability data "soft values" are computed as outputs. The soft values are accumulated to get the soft summation S. The soft summation S is compared to a predefined threshold Threshold_SoftSum, and if S exceeds Threshold_SoftSum, passes the estimated hard values to perform de-interleaving, then using a Viterbi decoder to decode the signal, else increments the counter N=N+1, and compares the counter N to a predefined threshold Threshold_IterationA. If N is less than Threshold_IterationA, provides soft value feedback to the channel estimator to estimate a more accurate channel impulse response h'(n), then passes the estimated channel impulse response to the equalizer again. If N exceeds Threshold_IterationA, passes the estimated hard values to perform de-interleaving, then using Viterbi decoder to decode the signal.

Two parameters Threshold_SoftSum and Threshold_IterationA are defined to determine when to terminate the iterative channel estimation. The hard values can be passed for de-interleaving and decoding if the soft summation S exceeds the Threshold_SoftSum. However, if the soft summation S falls below Threshold_SoftSum (S<Threshold_Sum) for Threshold_IterationA times, the channel is regarded as too noisy and cannot be improved with further iterative channel estimation, thus terminating the iteration process.

Figure 7A:
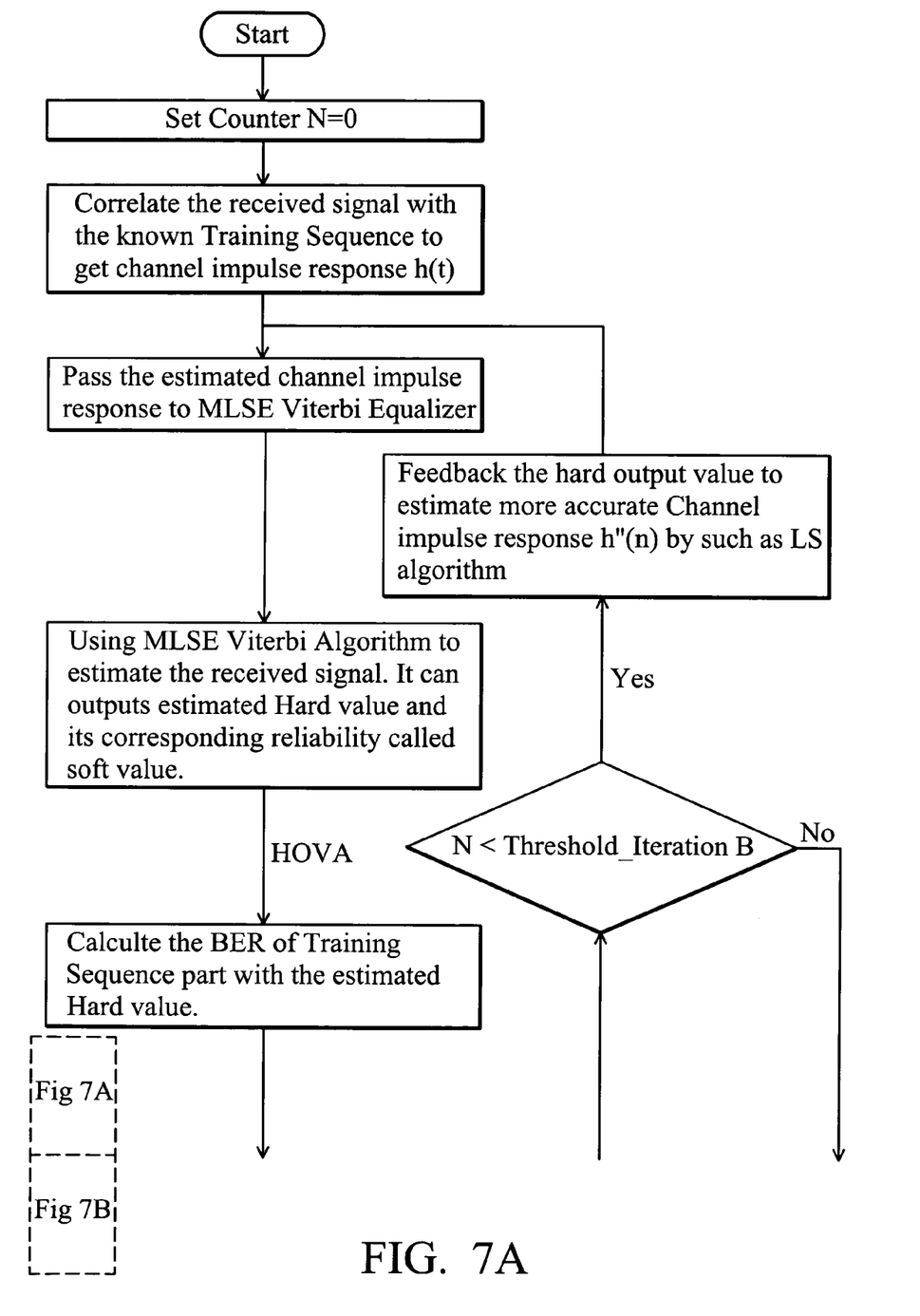
FIGS. 7A and 7B are flowcharts of iterative channel estimation using decision feedback for a HOVA system according to the present invention.
Figure 7B:
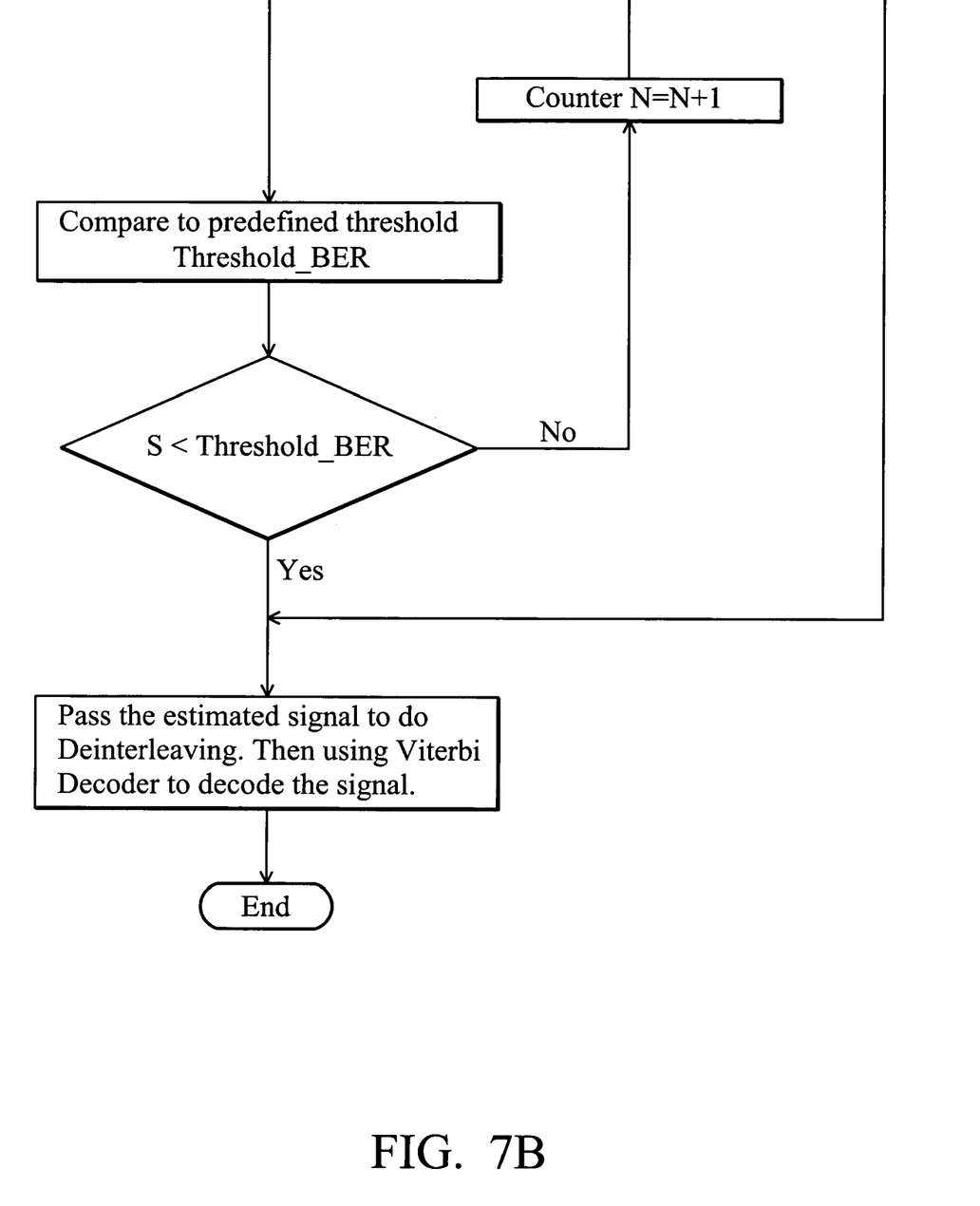

Similarly, a HOVA system initializes counter N=0 first, and correlates the received signal with a known training sequence to get an initial channel impulse response h(t). The estimated channel impulse response then passed to the equalizer, and the MLSE Viterbi Algorithm is used to estimate the received signal, which outputs only the estimated hard values. The BER of the training sequence is calculated with the estimated hard values and compared to a predefined threshold Threshold_BER. If S is less than Threshold_BER, the estimated hard values are passed to perform de-interleaving and decoding using a Viterbi decoder, otherwise, the counter is incremented by one, N=N+1, and the counter N then compared to a predefined threshold Threshold_IterationB. If N is less than Threshold_IterationB, the hard value feedback is provided to the channel estimator to estimate a more accurate channel impulse response h"(n), then the estimated channel impulse response is passed to the equalizer. If N is greater than Threshold_IterationB, the estimated hard values are passed to perform de-interleaving and decoding using a Viterbi decoder.

The defined thresholds regulate the trade off between computation complexity and system performance, for example, a strict Threshold_SoftSum (setting to a relative high value) or Threshold_BER (setting to a relative low value) allows the system to perform more trials for channel impulse response estimation, but also increases the computational complexity.

Finally, while the invention has been described by way of example and in terms of the above, it is to be understood that the invention is not limited to the disclosed embodiment. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of adaptive channel estimation using a decision feedback equalizer for equalizing a received signal, comprising the following steps:
   obtaining a channel impulse response and initializing a counter;
   computing hard values and corresponding reliability as soft values by estimating the received signal according to the channel impulse response using the decision feedback equalizer;
   accumulating the soft values to obtain a soft summation;
   comparing the soft summation to a first threshold;
   incrementing the counter for comparison with a second threshold when the soft summation does not exceed the first threshold; and
   updating the channel impulse response according to the soft values and returning to re-compute hard values and soft values when the counter does not exceed the second threshold and passing the hard values to perform de-interleaving when the counter exceeds the second threshold.

2. The adaptive channel estimation method according to claim 1, wherein the channel impulse response is initially obtained by correlating the received signal with a known training sequence.

3. The adaptive channel estimation method according to claim 1, wherein the received signal is estimated using the Maximum Likelihood Sequence Estimation (MLSE) Viterbi Algorithm.

4. The adaptive channel estimation method according to claim 1, further comprising:
   de-interleaving the hard values when the counter exceeds the second threshold; and
   decoding the de-interleaved hard values.

5. A system for processing a received signal, comprising:
   a channel estimator, estimating a channel impulse response for the received signal;
   an equalizer, receiving the channel impulse response from the channel estimator to estimate the received signal, and computing hard values and corresponding reliability as soft values according to the received signal and the channel impulse response; and
   a feedback decision-maker storing two thresholds t1 and t2, coupling to the equalizer to receive the hard values and soft values, accumulating the soft values to obtain a soft summation for comparison with threshold t1, providing decision feedback to the channel estimator for updating the channel impulse response according to the soft values and returning to re-compute the hard values and the soft values when the soft summation does not exceed t1 for less than t2 times, otherwise outputting the hard values.

6. The processing system according to claim 5, wherein the channel estimator derives the initial channel impulse response by correlating the received signal with a known training sequence.

7. The processing system according to claim 5, wherein the equalizer estimates the received signal using the Maximum Likelihood Sequence Estimation (MLSE) Viterbi Algorithm.

8. The processing system according to claim 5, further comprising:
   a de-interleaver, coupling to the feedback decision-maker to de-interleave the outputted hard values; and
   a decoder, coupling to the de-interleaver to decode the de-interleaved hard values.

9. The processing system according to claim 5, wherein the equalizer implements the Soft Output Viterbi Algorithm (SOVA).

10. The processing system according to claim 5, wherein the equalizer implements the Hard Output Viterbi Algorithm (HOVA).

* * * * *